United States Patent [19]

Frihart

[11] Patent Number: 5,296,557
[45] Date of Patent: Mar. 22, 1994

[54] TWO-COMPONENT CURABLE HOT MELT COMPOSITIONS

[75] Inventor: Charles R. Frihart, Lawrenceville, N.J.

[73] Assignee: Union Camp Corporation, Princeton, N.J.

[21] Appl. No.: 907,888

[22] Filed: Jul. 2, 1992

[51] Int. Cl.⁵ ............................................. C08L 63/00
[52] U.S. Cl. ............................... 525/423; 525/420.5; 525/523; 525/530; 528/93; 528/113; 528/119
[58] Field of Search ............... 525/423, 420.5, 523, 525/530; 528/93, 113, 119

[56] References Cited

U.S. PATENT DOCUMENTS

| | | | |
|---|---|---|---|
| 2,585,115 | 2/1952 | Greenlee | 260/47 |
| 2,705,223 | 3/1955 | Renfrew et al. | 260/18 |
| 2,707,708 | 5/1955 | Wittcoff | 260/18 |
| 2,867,592 | 1/1959 | Morris et al. | 260/18 |
| 2,881,194 | 4/1959 | Peerman et al. | 260/404.5 |
| 2,890,184 | 6/1959 | Foerster | 260/18 |
| 2,899,397 | 8/1959 | Aelony et al. | 260/18 |
| 2,930,773 | 3/1960 | Renfrew et al. | 260/18 |
| 2,977,332 | 3/1961 | Zumstein | 525/423 |
| 2,999,825 | 9/1961 | Floyd et al. | 260/18 |
| 2,999,826 | 9/1961 | Peerman et al. | 260/18 |
| 3,062,773 | 11/1962 | Rogier | 260/42 |
| 3,257,342 | 6/1966 | Kwong | 260/18 |
| 3,288,664 | 11/1966 | Hoppe | 156/310 |
| 3,377,303 | 4/1968 | Peerman et al. | 260/18 |
| 3,444,026 | 5/1969 | Peerman et al. | 156/331 |
| 3,488,665 | 1/1970 | MacGrandle et al. | 12/146 |
| 3,558,742 | 1/1971 | Schmid et al. | 260/830 |
| 3,578,727 | 5/1971 | Battersby et al. | 260/830 |
| 3,678,127 | 7/1972 | Schmid et al. | 260/830 P |
| 3,738,950 | 6/1973 | Starwold | 260/18 N |
| 3,847,875 | 11/1974 | Drawert et al. | 260/78 R |
| 3,956,208 | 5/1976 | Hoki et al. | 525/423 |
| 4,070,225 | 1/1978 | Batdorf | 156/311 |
| 4,082,708 | 4/1978 | Mehta | 260/18 |
| 4,119,615 | 10/1978 | Schulze | 525/423 |
| 4,191,669 | 3/1980 | Hinze et al. | 528/342 |
| 4,485,233 | 11/1984 | Veazey | 528/295.3 |
| 4,517,340 | 5/1985 | Read et al. | 525/113 |
| 4,566,931 | 1/1986 | Panoch et al. | 156/330.9 |
| 4,661,194 | 4/1987 | Lovald | 156/330.9 |
| 4,853,460 | 8/1989 | Harmon | 528/339 |
| 4,912,196 | 3/1990 | Leoni et al. | 528/339 |
| 5,070,174 | 12/1991 | Ohba | 528/104 |

FOREIGN PATENT DOCUMENTS 1530790 11/1974 United Kingdom .

Primary Examiner—Melvyn I. Marquis
Assistant Examiner—Randy Gulakowski
Attorney, Agent, or Firm—Woodcock Washburn Kurtz Mackiewicz & Norris

[57] ABSTRACT

This invention relates to two-component curable hot-melt compositions comprising thermoplastic polyamide resins that are substantially free of piperazine-containing polyamines. In one preferred embodiment the polyamide resins are the reaction product of an acid component with an amine component, wherein the amine component consists essentially of about (i) 20 to 100 equivalent percent of one or more acyclic diamines selected from the group consisting of 2-methyl-1,5-pentanediamine, 1,3-pentanediamine, 1,3-propanediamine, 1,5-pentanediamine, 1,7-heptanediamine, 1,9-nonanediamine, methyl-1,9-nonanediamine, 1,2-propanediamine, and 2-methyl-1,2-diaminopropane, and (ii) and about 0 to 80 equivalent percent of one or more polyamines selected from the group consisting of cyclic and acyclic polyamines other than those amines of (i). The compositions possess excellent heat resistance, flexibility, elasticity and resistance to solvents, including organic solvents and water.

21 Claims, No Drawings

TWO-COMPONENT CURABLE HOT MELT COMPOSITIONS

This invention is related to pending U.S. application Ser. No. 824,748, filed Jan. 17, 1992, which is a continuation of Ser. No. 479,830, filed Feb. 14, 1990 and now abandoned, and U.S. application Ser. No. 837,676, filed Feb. 14, 1992, which is a continuation of Ser. No. 475,584, filed Feb. 6, 1990 and now abandoned. This application is also related to pending U.S. application Ser. No. 743,050, filed Aug. 9, 1991.

FIELD OF THE INVENTION

This invention relates to new and improved amine and acid terminated polyamide/epoxy resin compositions useful as curable hot-melt adhesives, molded products, sealants or coatings. The preferred compositions contain one or more acyclic polyamines selected from the group consisting of 2-methyl-1,5-pentanediamine, 1,3-pentanediamine, 1,3-propanediamine, 1,5-pentanediamine, 1,7-heptanediamine, 1,9-nonanediamine, methyl-1,9-nonanediamine, 1,2-propanediamine and 2-methyl-1,2-diaminopropane. This invention further relates to the manufacture of the hot-melt compositions.

DESCRIPTION OF RELATED ART

It is known that dimer-based polyamides are useful for curing epoxy resins, as in U.S. Pat. Nos. 2,999,826 (Peerman et al.), 2,930,773 (Renfrew et al.), and 2,881,194 (Peerman et al.). However, these polyamides used are not solids at ambient temperatures, but are liquids having a high amine number. The liquid polyamides are mixed with liquid epoxies and allowed to cure. The products possess little cohesive strength until sufficient curing occurs. Certain of the cured products are useful as adhesives, but have shortcomings in that such products are usually very rigid and possess limited ductility and flexibility.

Curable hot-melt compositions have been made using polyamide resins and epoxy resins as broadly described in U.S. Pat. No. 2,705,223 (Renfrew et al.). The polyamides comprise the condensation products of polymeric fatty acids with aliphatic polyamines. Compositions varying from 10% epoxy resin and 90% polyamide resin to 90% epoxy resin and 10% polyamide resin are disclosed. Typically, the compositions taught by Renfrew do not possess good adhesive strength upon cure and provide limited working time after the mixing of the components. In addition, such compositions exhibit poor flexibility and poor resistance to heat, water and organic solvents when applied to substrates at ambient temperature.

The prior art teaches that adhesives having improved flexibility can be obtained by incorporating piperazine into polyamide resins. For example, U.S. Pat. No. 4,853,460, issued on Aug. 1, 1989 in the name of Harman, discloses an uncured polyamide composition comprising the reaction product of substantially equimolar quantities of an acid component and an amine component, wherein the amine component consists of about 25 to 75 percent equivalents of a cyclic diamine like piperazine, a non-cyclic aliphatic diamine like 2-methyl-1,5-pentanediamine, and one or more alkylene diamines. U.S. Pat. No. 4,082,708, issued Apr. 4, 1978 in the name of Mehta, teaches an adhesive system comprising an epoxy resin and a polyamide wherein the polyamide is derived substantially from 1,4-(bis-aminoalkyl)piperazine. Although useful as cured products, these piperazine-based polyamide compositions exhibit poor recovery and limited flexibility. In addition, the piperazine-containing polyamides readily absorb aqueous and organic solvents and hydrolyze easily. It has been proven to be particularly difficult to achieve hot-melt compositions having good solvent and water resistance using the piperazine-containing polyamides of the prior art.

In U.S. Pat. No. 4,566,931, issued Jan. 28, 1986 in the name of Panoch et al., there is described a heat sealable non-cured adhesive consisting essentially of copolyamides produced from omega amino carboxylic acids or lactams having 6 to 12 carbon atoms, dicarboxylic acids, and alpha-omega diamines wherein at least about 30% by weight of the diamines consist of singly branched diamine having 6 carbon atoms.

Accordingly, two and three component curable epoxy adhesive compositions are well known. However, heretofore it has been very difficult to obtain two-component, curable hot-melt compositions that do not contain substantial amounts of piperazine, and that nonetheless exhibit good bond strengths, long open assembly times, good flexibility and low brittleness. It is another goal of those skilled in the art to obtain such two-component, hot-melt compositions that also exhibit, at the same time, good resistance to heat, water and organic solvents.

SUMMARY OF THE INVENTION

The novel two-component curable hot-melt compositions of the invention comprise a thermoplastic polyamide resin and an epoxy resin, wherein the epoxy resin has at least two epoxy groups per molecule of epoxy resin; the polyamide resin is substantially free of piperazine-containing polyamines and has a softening point above about 40° C. and an amine plus acid number less than about 75; and wherein the initial ratio of free (that is, unreacted) amine and acid groups of the polyamide resin to epoxy groups of the epoxy resin is between about 1:1 and 1:10.

The polyamide resins of the invention comprise the reaction products of (a) an acid component comprising one or more polymeric fatty acids and optionally at least one acid selected from the group consisting of linear dicarboxylic and monocarboxylic acids, and (b) an amine component consisting essentially of (i) about 20 to 100 equivalent percent of one or more acyclic diamines comprising at least one branched diamine provided that said branched diamine is other than 3-(N-isopropylamino)propylamine, at least one unbranched diamine selected from the group consisting of 1,3-pentanediamine, 1,3-propanediamine, 1,5-pentanediamine, 1,7-heptanediamine, 1,9-nonanediamine and 1,2-propanediamine, or mixtures of said branched and unbranched diamines; and (ii) about 0 to 80 equivalent percent of one or more polyamines selected from the group consisting of acyclic and cyclic polyamines other than those amines of (b)(i), based on total equivalents of the amine component (b).

Preferably, the thermoplastic polyamide resins comprise the reaction products of an acid component and an amine component, wherein said amine component consists essentially of (i) about 20 to 100 equivalent percent of one or more acyclic diamines selected from the group consisting of 2-methyl-1,5-pentanediamine, 1,3-pentanediamine, 1,3-propanediamine, 1,5-pentanediamine, 1,7-heptanediamine, 1,9-nonanediamine, methyl-1,9-nonanediamine, 1,2-propanediamine and 2-methyl-1,2- diaminopropane, and (ii) about 0 to 80 equivalent percent of one or more polyamines selected from the group consisting of acyclic and cyclic polyamines other than those amines of (b)(i), based on total equivalents of the amine component (b).

The compositions of the invention possess several advantageous properties exhibited by some piperazine-containing polyamines, including high bond strengths, long open assembly times, excellent ductilities, flexibilities and elasticities, and good heat resistances. For example, the preferred cured compositions of the invention possess tensile moduli of less than about 30,000 psi, preferably less than about 20,000 psi, even more preferably less than about 15,000 psi, and most preferably less than about 10,000 psi at 25° C. (using ASTM standard test method D 1708-84 and the secant modulus measurement technique defined in ASTM standard method D 638-89). In addition, the compositions, both uncured and cured, are non-brittle. Samples are readily stamped out using preferred compositions of the invention without heating those samples first to prevent breakage. It has surprisingly been found that the compositions of the invention exhibit good elasticity and flexibility a long time after their manufacture.

In addition, the compositions of the invention exhibit several additional desirable properties that typically are not shown by piperazine-containing polyamines; namely, the compositions possess excellent resistance to solvent attack and moisture damage. The compositions of the invention are particularly advantageous in that they exhibit excellent resistance to swelling by organic and aqueous solvents, including water. Accordingly, the compositions of the invention are especially useful as hot-melt adhesives.

The invention also comprises methods for the production of the cured and uncured compositions, and methods for bonding a first and second substrate using the compositions of the invention.

DETAILED DESCRIPTION OF THE INVENTION

The invention pertains to an improved two-component curable hot-melt composition comprising a thermoplastic polyamide resin that is substantially free of piperazine-containing polyamines, and an epoxy. The polyamide resin has a softening point above about 40° C. and an amine plus acid number less than about 75. The polyamide resin either can be substantially amine-terminated and have an excess of amine to acid groups, or acid terminated and have an excess of acid to amine groups. The epoxy resin has at least two epoxy groups per molecule of epoxy resin. The initial ratio of total free amine and acid groups of the polyamide resin to epoxy groups is between 1:1 and 1:10. Thus, each amine (or acid) group becomes reacted with an epoxy group, thereby linking the polyamide chains with the epoxy network. Accordingly, when using a typical epoxy with an equivalent weight of 190 grams per epoxy group, the weight of epoxy is from about 2% to about 35% of the weight of the polyamide. Preferably, the weight of the epoxy is from about 5% to about 15% of that of the polyamide.

The compositions of the invention, most broadly, can be made using any thermoplastic polyamide polymer that is substantially free of piperazine-containing polyamines. In a preferred group of compositions within the invention, the polyamides should have an amine plus acid number greater than about 1 and less than about 75. Preferably, the polyamides should have an amine plus acid number less than about 40, more preferably less than about 30, and most preferably less than about 20, (the amine functionality is expressed in a conventional manner in terms of mg. of equivalent KOH/g of sample and is measured by conventional titrametric analytical techniques).

Preferably, the polyamides should have an excess of amine to acid groups, and the number of amine groups of the polyamide resin should exceed the number of acid groups by about 2% to about 50%. With lower functionality, the groups are too dispersed to cure sufficiently. With higher functionality, there is risk of premature gelation or at least excessive viscosity. For better initial adhesive strength quality (also known as "green strength"), the polyamide resins should also have a softening point above about 40° C., preferably above about 60° C., more preferably between about 60° C. and about 150° C.

The methods of preparing the polyamide compositions of this invention are well known in the art. The polyamide resins of the invention comprise the reaction product of (a) an acid component comprising non-linear polymerized fatty acids, and optionally, at least one acid selected from the group consisting of linear dicarboxylic and monocarboxylic acids, and (b) an amine component consisting essentially of one or more acyclic polyamines comprising at least one branched diamine provided that said branched diamine is other than 3-(N-isopropylamino)propylamine, or at least one unbranched diamine selected from the group consisting of 1,3-pentanediamine, 1,3-propanediamine, 1,5-pentanediamine, 1,7-heptanediamine, 1,9-nonanediamine and 1,2-propanediamine, or mixtures of said branched and unbranched diamines; and optionally one or more additional polyamines other than those amines of (b)(i).

The polymeric fatty acids, sometimes referred to as "dimer acids", are complex mixtures resulting from the polymerization of fatty acids. The term "dimer acid" is in common use in the resin field and refers to nonlinear polymeric or oligomeric fatty acids typically made from addition polymerization of unsaturated tall oil fatty acids. These polymeric fatty acids typically have the composition 0–10% $C_{18}$ monobasic acids, 60–95% $C_{36}$ dibasic acids, and 1–35% $C_{54}$ tribasic and higher polymeric acids. The relative ratios of monomer, dimer, trimer and higher polymer in unfractionated "dimer acid" are dependent on the nature of the starting material and the conditions of polymerization and distillation. Methods for the polymerization of unsaturated fatty acids are described, for example, in U.S. Pat. No. 3,157,681. The dimer content is also controlled by the fractionation conditions used to reduce the monomer, trimer and higher polymer components. Non-linear dicarboxylic acids having 21 to 44 carbon atoms are preferred. Polymeric fatty acids having a dimeric fatty acid content greater than about 65 percent by weight are also preferred.

A wide variety of linear dicarboxylic acids having 2 to about 24 carbon atoms may also be employed together with the polymeric fatty acids in the preparation of the compositions of the invention. Preferred dicarboxylic acids have from 6 to 22 carbon atoms and include adipic, pimelic, suberic, azelaic, sebacic, dodecanedioic acids, and mixtures thereof. Methods of preparing these preferred acids are well known and they are readily available commercially. Even more preferred are adipic, azelaic, sebacic and dodecanedioic acids. It should be understood that use of the corresponding anhydrides, esters and acid chlorides of these acids is included in the term "dicarboxylic acid". Aromatic dicarboxylic acids or their corresponding anhydrides, esters or acid chlorides may also be used. These acids include phthalic, isophthalic and terephthalic acids.

Linear dicarboxylic acids may be added to the reaction mixture in amounts ranging from 0 up to about 80 equivalent percent, preferably 0 to about 70 equivalent percent (i.e., 0–70% of the total acid groups present in the mixture before polymerization are derived from the linear dicarboxylic acid component), more preferably about 10 to about 60 equivalent percent, based on total equivalents of the acid component (a).

A linear monocarboxylic acid may be added in addition to or instead of the linear dicarboxylic acid, in amounts up to about 10 equivalent percent, to control the molecular weight and/or to change the ratio of amine to acid groups. Preferred monocarboxylic acids are linear and have 2 to 22 carbon atoms. Most preferred are stearic acid and tall oil fatty acids, oleic acids and mixtures thereof.

Preferably acid component (a) is comprised of about 20–100 equivalent percent of polymeric fatty acids, and about 0–80 equivalent percent of at least one acid selected from the group consisting of linear dicarboxylic and monocarboxylic acids, based upon total equivalents of the acid component (a). More preferably, acid component (a) is comprised of about 30–100 equivalent percent of polymeric fatty acids, 0–70 equivalent percent of linear dicarboxylic acids, and 0–10 equivalent percent of linear monocarboxylic acids, based on total equivalents of the acid component. Thus, the polyamides of the invention can comprise the reaction product of an acid component consisting essentially of one or more polymeric fatty acids, and an amine component.

The thermoplastic polyamide resins of the invention are "substantially free of piperazine-containing polyamines". Accordingly, the polyamide resins of the invention are made from polyamines that do not contain substantial amounts of piperazine, or piperazine derivatives, including 1,2-di(1-piperazinyl)propane, 1,3-di-(1-piperazinyl)propane, 1,2-di-(1-piperazinyl)ethane, 1,4-di-(1-piperazinyl)butane, N-hydroxyethylpiperazine and 1,4 bis(aminopropyl)piperazine. Although the polyamide resins of the invention can contain a small amount of these compounds, say up to about 7 equivalent percent, preferably, they contain less than about 5, more preferably less than about 3, and most preferably less than about 1 equivalent percent.

The polyamide resin of the invention comprises the condensation reaction product of an acid component (a) and an amine component (b). The acyclic polyamines which form component (i) of the amine component (b) are one or more acyclic diamines comprising at least one branched diamine provided that said branched diamine is other than 3-(N-isopropylamino)propylamine, or at least one unbranched diamine selected from the group consisting of 1,3-pentanediamine, 1,3-propanediamine, 1,5-pentanediamine 1,7-heptanediamine, 1,9-nonanediamine, and 1,2-propanediamine. Preferably, the acyclic polyamines which form component (i) are one or more diamines selected from the group consisting of 2-methyl-1,5-pentanediamine, 1,3-pentanediamine, 1,3-propanediamine, 1,5-pentanediamine, 1,7-heptanediamine, 1,9-nonanediamine, methyl-1,9-nonanediamine, 1,2-propanediamine and 2-methyl-1,2-diaminopropane. The use of such acyclic polyamines (with few piperazine-containing amine groups present) is a feature which distinguishes the polyamide resins of this invention over those known in the prior art and which, tests indicate, lends to these compositions their improved elasticity, flexibility and resistance to solvents.

Additional polyamines which optionally form component (ii) of the overall amine component (b) may be selected from the group consisting of acyclic and cyclic polyamines other than those amines of (b)(i), and also excluding substantial amounts of piperazine as defined above. Suitable polyamines may be one or more of the linear, cycloaliphatic or aromatic diamines having from about 2 to 20 carbon atoms. Other examples of suitable polyamines include polyetherdiamines, polyglycol diamines and mixtures thereof. Illustrative of preferred polyamines are ethylenediamine, 1,4-butanediamine, hexamethylenediamine, cyclohexanediamine, bisaminoethylcyclohexane, bisaminomethylcyclohexane, xylenediamine and isophoronediamine. Also preferred are Jeffamine ™ D and ED series polyetherdiamines from the Texaco Corporation. Polyamines and monoamines may also be added in an amount up to about 10 equivalent percent to control molecular weight, viscosity and functionality. Mixtures of polyamines can also be used to obtain a good balance of properties.

Preferably, component (b) is comprised of an amine component consisting essentially of about 20 to about 100 equivalent percent of one or more acyclic diamines of (i) (i.e., 22–100% of the total amine groups present in the amine before polymerization are derived from the acyclic diamines of (i)), and about 0 to 80 equivalent percent of one or more polyamines of (ii), based on total equivalents of the amine component (b). More preferably, component (b) is about 30 to 100 equivalent percent of said acyclic diamines of (i), and about 0 to 70 equivalent percent of said polyamines of (ii). Even more preferably, component (b) is about 45 to 100 equivalent percent of said acyclic diamines of (i), and about 0 to 55 equivalent percent of said polyamines of (ii). The relative equivalent amounts of acyclic polyamine component (i) and polyamines (ii) in the amine component (b) of the polyamide can be varied to achieve a polyamide with the desired flexibility, elasticity, stiffness, non-brittleness and resistance to solvents.

Equivalent percent values as used herein are determined as follows. The total number of free acid groups in the acid component (a) added to the polymerization reaction is set equal to 100 equivalent percent. The equivalent percent of amine component (b) is then based on that of acid component (a); i.e. total number of free amine groups in the amine component (b) added to the polymerization reaction is expressed as a percentage of the total number of free acid groups.

Polyamide resin compositions of this invention comprise the reaction product of about 100 to 150 equivalent percent of said amine component. Preferably, such polyamide resins are substantially amine terminated and have an excess of free amine to acid groups. Preferred polyamide resin compositions of the invention having an excess of free amine to acid groups may comprise the reaction product of about 100 to 125 equivalent percent of said amine component to total equivalent percent of said acid components, with the reaction product of about 105 to 120 equivalent percent of said amine component based upon total equivalent percent of said acid components being more preferred.

Alternatively, polyamide resin compositions of this invention may comprise the reaction product of about 55 to 100 equivalent percent of said amine components, based on total equivalent percent of said acid component added to the polymerization; preferably, such preferred polyamide resins are substantially acid terminated and have an excess of free acid to amine groups. Other preferred polyamide resin compositions having an excess of free acid to amine groups may comprise the reaction product of about 75 to 100 equivalent percent of said amine component, based on total equivalent percent of said acid component, and more preferably comprise the reaction product of about 80 to 95 equivalent percent of said amine component, based on total equivalent percent of said acid component.

In another embodiment, the relative quantities of acid components (a) and amine components (b) are selected so that substantially equivalent numbers of reactive carboxyl and amine groups are present in the reaction mixture to produce a neutral or balanced polyamide, i.e., the acid and amine numbers are substantially equal. However, the polymerization is not driven to completion so that some carboxylic acid and amine groups are still free.

The equivalent percent of carboxyl to amine functional groups is preferably maintained between 100:55 and 100:150 so that acid plus amine numbers will be less than 75, preferably less than about 40, more preferably less than about 30, even more preferably less than about 20 and more than about 5.

The techniques and general methods for polymerizing the mixed reactants of the polyamide compositions are well known; see, for example, U.S Pat. Nos. 3,377,303, 4,343,743 and 4,485,233. In general, the polyamides of the present invention are prepared by charging a resin kettle with the reactants, in proportions herein described, and heating the mixture to a temperature at which random polymerization occurs. In general, the reactants are heated to a temperature of from about 140° C. to about 200° C. to initiate polymerization, and thereafter at a temperature sufficient to distill off the water of condensation. Preferably, the heating is carried out under an inert gas atmosphere such as a blanket of nitrogen gas. The completion of the polymerization is aided by removing the final traces of water using a vacuum and elevated temperatures. To assist polymerization, a polymerization catalyst may be added in catalytic proportion. Representative of such catalysts are phosphoric acid, triphenylphosphite, or tin salts. The heating of the reaction mixture may be carried out until a selected viscosity of the reaction mixture is reached, for example, 1,000–25,000 cps at 190° C., and preferably 2,000–10,000 cps at 190° C. In addition, small amounts (0.5 to 10 equivalent percent) of a saturated linear carboxylic acid containing 5-20 carbons such as, for example, stearic acid, or other monomers such as phenylbenzoate may be added to the mixture to control molecular weight and viscosity.

The hot melt composition comprising the thermoplastic polyamide resin may be utilized in its uncured state, that is, without combining it with epoxy resin, since even in their uncured state the polyamides of the invention possess excellent flexibility. Alternatively, the thermoplastic resin can be combined with various epoxy resins as described herein to achieve a cured product with good flexibility and improved resistance to moisture.

The present invention is applicable to epoxy resins having two or more epoxy groups per molecule of epoxy resin. The preferred epoxy resins are multifunctional, that is, they have a functionality equal to or greater than 2, in order to develop good heat resistance. The most preferred epoxy resins have from at least 2, and preferably about 2.2 to about 8 epoxy groups per molecule. The epoxy compositions which may be used for curing are generally linear epoxies based upon the diglycidyl ether of bisphenol A or bisphenol A oligomers, or branched types based upon the multi-glycidyl ethers of phenolformaldehyde or cresol-formaldehyde resins, or epoxidized olefins, including unsaturated fatty oils. The most preferred epoxy resins are multifunctional epoxy novalac resins such as the D.E.N. ™ epoxy novalac resins sold by The Dow Chemical Company (Midland, Mich.). D.E.N. 431 has an average of 2.2 epoxy groups per molecule, D.E.N. 438 has an average functionality of 3.6, and D.E.N. 439 resin has an average functionality of 3.8.

It is preferred if the initial (i.e., prior to mixing) ratio of free amine and acid groups of the polyamide resin to epoxy groups of the epoxy resin is between about 1:1 and 1:10. It is more preferred if the ratio of free amine and acid groups to epoxy groups is between about 1:1 and 1:6. The most preferred ratio is between about 1:1.5 and 1:4.

It will be evident to one skilled in the art of adhesive formulation that other additives such as fillers, reinforcing agents, coupling agents, colorants, odorants, other comonomers, resins, tackifiers, plasticizers, lubricants, stabilizers, antistats, and the like can optionally be added. In addition, antioxidants can be added at any point during the reaction sequence.

The application and curing of the polyamide-epoxy resin composition is effected very simply. The polyamide and epoxy resins may be melted separately, subsequently mixed together and then coated upon the substrate as a molten mixture. Alternatively, one of the components may be melted first and then the other component admixed with it. The reaction temperature will generally not exceed 190° C., since at higher temperatures some cracking or premature polymerization of the reaction products will occur. Of course, a coating of the molten thermoset compositions may be applied upon any or all areas or surfaces of one or more substrates.

The method for bonding at least a first and second substrate comprises the steps of coating one surface of the first substrate with the molten thermoset compositions of the present invention, contacting the second substrate to the coated surface of the first substrate, and allowing the composition to cure. The thermoset compositions will cure at room temperature; alternatively, pressure and/or heat may be applied to the first and second substrates after contacting the second substrate to the coated surface of the first substrate in order to accelerate the cure. The curing temperature will generally be between about 10° C. and about 100° C. and the times from on the order of 2 hours at the higher temperature to approximately 2 weeks at the lower temperature. Curing accelerators can be added to the hot-melt compositions if desired.

The thermoset compositions may be applied to a wide variety of substrates, including rigid or flexible, natural or synthetic materials, which require an adhesive of high strength, durability and resistance. They may be employed to adhere to leather, suede, woven and nonwoven fabrics, rubber, polyurethanes, vinyl, polycarbonate, polystyrene, and the like. They are also useful for hot melt bonding materials such as metals, wood, glass, paper products and the like.

The resultant products, after application and upon cooling, are thermosets having good initial adhesive strength at room temperature. The term thermoset, as used herein, denotes a material that either will undergo or has undergone a chemical reaction by the action of heat, catalysts, ultraviolet light or other means, leading to a relatively infusible state. Upon curing, the thermoset compositions demonstrate improved organic solvent resistivity, water resistivity and heat resistivity. Since the compositions exhibit low solvent absorption properties, they do not suffer greatly from swelling caused by absorption of organic and aqueous solvents.

Moreover, after cure, the hot-melt compositions of the invention possess excellent bond strengths and superior heat resistance. In addition, they possess low brittleness, good elasticity, and excellent flexibility and ductility. Adhesives made of the hot-melt compositions of the invention do not become rigid even months after they are applied.

The invention will be made clearer by reference to the following examples. These examples are presented for the purpose of illustration and to further set forth the best mode of carrying out the invention. These examples are not to be construed as limiting the appended claims.

In these examples and to obtain the values set forth in Tables 1 and 2, the following tests were used:

Softening Point, Ring and Ball ASTM No. E-28
Viscosity at 190° C., Brookfield Thermosel System with RVT Viscometer and Spindle
Tensile Strength, Elongation, ASTM No. D 1708-84
Tensile Modulus ASTM No. D 1708-84 using secant modulus measurement technique defined in ASTM No. D 638-89
Impact Brittleness ASTM D-746-79

The flexibility of the hot-melt compositions was determined using several different measurement techniques. For example, the tensile moduli of the hot melt compositions described in the Examples herein was measured using an Instron. The secant modulus for 0 to 4 percent elongation, as defined in ASTM No. D 638-89 (dated Jan. 27, 1989, entitled Standard Test Method for Tensile Properties of Plastics, see Annex A1.17) was measured using the sample preparation method and test method described in ASTM No. D 1708-84 (dated Jul. 27, 1984, entitled Standard Test Method for Tensile Properties of Plastics By Use of Microtensile Specimens), the disclosures of which are hereby incorporated by reference. The procedures set forth in these test methods were followed except that the samples were die cut from sheets having a thickness of approximately 0.07 inches and the cured samples were stored under ambient conditions for at least one week prior to testing. In addition, the crosshead speed on the chart recorder was set at two inches per minute.

Data needed to determine the secant modulus was collected and analyzed using the Instron Series IX Automated Materials Testing System, Version 5 (M22-12410-3, Issue A, August 1990).

The superior flexibility properties exhibited by the hot-melt compositions of this invention in comparison to the flexibility achieved by prior art compositions (as shown by comparison examples 1 and 2) are depicted in Tables 1 and 2 below. The more flexible hot-melt compositions of the invention have lower secant-tensile moduli.

The flexibility of the hot melt compositions was also measured using dynamic mechanical analysis. Rectangular cured samples of 0.375 inches by 2 inches were die cut from a sheet of resin product having a thickness of about 0.07 inches. Each of the cured samples was then stored under ambient conditions for at least one week prior to testing. The samples were then tested using the torsional rectangular samples, clamp and mode of analysis on a Rheometrics Dynamic Analyzer (Model RDA-700). The samples were held at 0.5% strain and 23° C., while the frequency of oscillation was increased from 0.1 to 500 radians per second in 3 steps per decade. The values were reported at 100 radians per second. The shear storage modulus values (reported in units of dynes/cm$^2$) obtained for the hot-melt compositions of the invention and prior art compositions (comparison examples 1 and 2) are reported in Table 1.

Another test which was used to measure the flexibility of the compositions of the invention was the low temperature impact test. In this test each of the cured samples was stored under ambient conditions for at least one week prior to testing. The cured samples were prepared and run in accordance with ASTM Method D 746-79, dated Jan. 26, 1979, entitled Standard Test Method for Brittleness Temperature of Plastics and Elastomers by Impact. The test was started at 23° C., then the temperature was lowered in 10 degree increments starting at 10° C. The lowest temperature at which 100% of the samples did not fracture was recorded and is shown in Table 2.

TABLE 1

| | Polyamide | Uncured | | Epoxy Cured | |
| --- | --- | --- | --- | --- | --- |
| Example | Amine Used | Amine Number /Acid Number | Softening Point, °C. | Tensile Modulus, psi | Shear Storage Modulus |
| Comp. 1 | Ethylenediamine | 12.9/0.9 | 121 | 45,000 | $2.6 \times 10^9$ |
| Comp. 2 | Hexamethylenediamine | 10.0/0.5 | 97 | 31,750 | $1.8 \times 10^9$ |
| 3 | 1,3-Propanediamine | 10.2/2.8 | 84 | 12,400 | $7.4 \times 10^8$ |
| 4 | 1,5-Pentanediamine | 9.4/0.6 | 95 | 13,450 | $1.0 \times 10^9$ |
| 5 | 1,3-Pentanediamine | 12.1/0.4 | 71 | 2,100 | $1.7 \times 10^8$ |
| 6 | 2-Methyl-1,5-pentanediamine | 14.0/0.5 | 68 | 4,950 | $1.1 \times 10^8$ |
| 7 | 1,2-Propanediamine | 15.0/1.7 | 77 | 6,125 | $1.0 \times 10^9$ |

TABLE 2

| Example | Amine Used | Temperature for 100% Pass, °C. |
|---|---|---|
| Compar. 1 | Ethylenediamine | 23 |
| Compar. 2 | Hexamethylenediamine | 23 |
| 3 | 1,3-Propanediamine | 0 |
| 6 | 2-Methyl-1,5-pentanediamine | −10 |
| 7 | 1,2-Propanediamine | 10 |

COMPARISON EXAMPLE 1

Resin (a): UNIDYME® 14 polymerized fatty acid (from Union Camp Corporation, Wayne, N.J.) (100 equivalent percent), VanLube® 81 dioctylated diphenyl (from R. T. Vanderbilt, Norwalk, Conn.) (1 weight percent), and Irganox® 1010 tetrakis(methylene(3,5-di-tert-butyl-4-hydroxyhydrocinnamate))methane (from Ciba-Geigy Corporation, Ardsley, N.Y.) were warmed in a reaction kettle equipped with a mechanical stirrer, nitrogen inlet, thermocouple, Barrett trap, and a condenser. When the temperature reached about 80° C. ethylenediamine was added (Aldrich Chemical Company, Milwaukee, Wis.) (107 equivalent percent). Water was collected in the trap until the temperature reached about 230° C. Then several drops of phosphoric acid were added. The nitrogen was removed, and the reaction was placed under vacuum for several hours to remove any remaining water. The molten polyamide was poured out for the various tests. The polyamide had a 4% secant tensile modulus of 29,379 psi.

Cured Product (b): The resin 1(a) (40 grams) was heated in a metal can in an oven at about 190° C. for an hour. Then 4 g of D.E.N. 439 (Dow Chemical Corporation, Midland, Mich.) was rapidly mixed with the polyamide, and the product was poured out for testing. For tensile samples, the product was pressed out soon after being made and stamped out using a mallet and die.

COMPARISON EXAMPLE 2

The procedure set forth in comparison example 1(a) and 1(b) was followed, except that hexamethylenediamine was used in place of ethylenediamine.

EXAMPLES 3–7

A procedure similar to that given in comparison example 1 was used except that ethylenediamine was replaced by the following diamines:
Example 3: 1,3-propanediamine (Aldrich Chemical)
Example 4: 1,5-pentanediamine (Aldrich Chemical)
Example 5: 1,3-pentanediamine (Dytek ™ EP from Du Pont Chemicals, Wilmington, Del.)
Example 6: 2-methyl-1,5-pentanediamine (Dytek ™ A from Du Pont)
Example 7: 1,2-propanediamine (Pfaultz & Bauer, Waterbury, Conn.)

EXAMPLE 8

The procedure in Comparison Example 1(a) was followed, except that the formulation involved 60 equivalent % of Unidyme 14, 40 equivalent % of sebacic acid (Union Camp Corporation, Wayne, N.J.) and 109 equivalent % of Dytek A, along with antioxidants and catalyst. The polyamide had a softening point of 86° C., an acid number of 0.7, an amine number of 16 and a 4% secant modulus of 2,475 psi.

This product was cured by the method given in Comparison Example 1(b) to yield a product with a 4% secant tensile modulus of 7500 psi.

EXAMPLE 9

The procedure in Comparison Example 1(a) was followed, except that the formulation involved 50 equivalent of Unidyme 14, 50 equivalent % of sebacic acid (Union Camp Corporation, Wayne, N.J.), 55 equivalent % of hexamethylenediamine, and 55 equivalent % of Dytek A, along with antioxidants and catalyst. The polyamide had a softening point of 132° C., an acid number of 0.5, and an amine number of 17.

This product was cured by the method given in Comparison Example 1(b) to yield a product with a 4% secant tensile modulus of 7475 psi.

EXAMPLE 10

The procedure in Comparison Example 1(a) was followed, except that the formulation involved 50 equivalent % of Unidyme 14, 50 equivalent % of sebacic acid (Union Camp Corporation, Wayne, N.J.), 55 equivalent % of ethylenediamine, and 55 equivalent % of Dytek A, along with antioxidants and catalyst. The polyamide had a softening point of 143° C., an acid number of 0.6, and an amine number of 15.

This product was cured by the method given in Comparison Example 1(b) to yield a product with a 4% secant tensile modulus of 5775 psi.

What is claimed is:

1. A two-component curable hot-melt composition comprising:
   (1) a thermoplastic polyamide resin that is substantially free of piperazine-containing polyamines, said polyamide resin having a softening point above about 40° C. and an amine plus acid number less than about 75;
   wherein said polyamide resin comprises the reaction product of (a) an acid component comprising one or more polymeric fatty acids and optionally at least one acid selected form the group consisting of linear dicarboxylic and monocarboxylic acids, and (b) an amine component consisting essentially of (i) about 45 to 100 equivalent percent of one or more acyclic diamines selected from the group consisting of 2-methyl-1,5-pentanediamine, 1,3-pentanediamine, 1,3-propanediamine, 1,5-pentanediamine, 1,7-heptanediamine, 1,9-nonanediamine, methyl-1,9-nonanediamine, 1,2-propanediamine and 2-methyl-1,2-diaminopropane, and (ii) about 0 to 55 equivalent percent of one or more polyamines selected form the group consisting of acyclic polyamines other than those amines of (b) (i), based on total equivalents of the amine component (b); and
   (2) an epoxy resin, said epoxy resin having at least two epoxy groups per molecule of epoxy resin;
   wherein the initial ratio of free maine and acid groups of the polyamide resin to epoxy groups of the epoxy resin is between about 1:1 and 1:10; and
   wherein the cured composition possesses a tensile modulus of less than about 20,000 psi, using ASTM standard test method D 1708-84 and the secant modulus measurement technique defined in ASTM standard method D 638-89.

2. A composition according to claim 1 where the acid component is about 20–100 equivalent percent of said polymeric fatty acids and about 0–80 equivalent percent of at least one acid selected from the group consisting of linear dicarboxylic and monocarboxylic acids, based on total equivalents of the acid component (a).

3. A composition according to claim 2 where the acid component is about 30–100 equivalent percent of said polymeric fatty acids, about 0–70 equivalent percent of $C_6$–$C_{22}$ dicarboxylic acids and about 0–10 equivalent percent of $C_2$–$C_{22}$ monocarboxylic acids, based on total equivalents of the acid component.

4. A composition according to claim 1 where the polymer fatty acid has a dimeric fatty acid content greater than about 65 percent by weight.

5. A composition according to claim 1 where at least some linear dicarboxylic acid is present, wherein said acid is selected from the group consisting of adipic, pimelic, suberic, azelaic, sebacic, dodecanedioic acids, and mixtures thereof.

6. A composition according to claim 1 where at least some monocarboxylic acid is present, wherein said acid is selected from the group consisting of stearic, tall oil fatty, oleic acids, and mixtures thereof.

7. A composition according to claim 1 where the polyamide resin comprises the reaction product of about 100–150 equivalent percent of said amine component (b) based on total equivalent percent of said acid component (a) added to the polymerization, and wherein said polyamide resin is substantially amine terminated and has an excess of free amine to acid groups.

8. A composition according to claim 7, where the polyamide resin comprises the reaction product of about 100–125 equivalent percent of said amine component (b) based on total equivalent percent of said acid component (a).

9. A composition according to claim 7 where the polyamide resin comprises the reaction product of about 105–120 equivalent percent of said amine component (b) based on total equivalent percent of said acid component (a).

10. A composition according to claim 1 where the polyamide resin comprises the reaction product of about 55–100 equivalent percent of said amine component (b) based on total equivalent percent of said acid component (a) added to the polymerization, and wherein said polyamide resin is substantially acid terminated and has an excess of free acid to amine groups.

11. A composition according to claim 10 where the polyamide resin comprises the reaction product of about 75–100 equivalent percent of said amine component (b) based on total equivalent percent of said acid component (a).

12. A composition according to claim 10 where the polyamide resin comprises the reaction product of about 80–95 equivalent percent of said amine component (b) based upon total equivalent percent of said acid component (a).

13. A composition according to claim 1 where amine component (ii) is present and is selected from the group consisting of polyetherdiamines, polyglycol diamines, and mixtures thereof.

14. A composition according to claim 1 wherein said acyclic diamine (1)(b)(i) is 2-methyl-1,5-pentanediamine.

15. A composition according to claim 1 wherein said acyclic diamine (1)(b)(i) is 1,3-pentanediamine.

16. A composition according to claim 1 wherein said acyclic diamine (1)(b)(i) is 1,2-propanediamine.

17. A Composition according to claim 1 wherein said polyamide resin has an amine plus acid number less than about 20.

18. A composition of claim 1, wherein the epoxy resin has at least two epoxy and no more than eight epoxy groups per molecule of epoxy resin.

19. A composition of claim 1, wherein the initial ratio of free amine and acid groups of the polyamide resin to epoxy groups of the epoxy resin is between about 1:1 and 1:6.

20. A composition of claim 19, wherein the initial ratio of free amine and acid groups of the polyamide resin to epoxy groups of the epoxy resin is between about 1:1 and 1:4.

21. A two-component curable hot-melt composition comprising:
(1) a thermoplastic polyamide resin that is substantially free of piperazine-containing polyamines, said polyamide resin having a softening point above about 40° C. and an amine plus acid number less than about 75;
wherein said polyamide resin comprises the reaction product of (a) an acid component comprising one or more polymeric fatty acids and optionally at least one acid selected from the group consisting of linear dicarboxylic and monocarboxylic acids, and (b) an amine component consisting essentially of (i) about 45 to 100 equivalent percent of one or more acyclic diamines comprising at least one branched diamine provided that said branched diamine is other than 3-(N-isopropylamino)propylamine, or at least one unbranched diamine selected from the group consisting of 1,3-pentanediamine, 1,3-propanediamine, 1,5-pentanediamine, 1,7-heptanediamine, 1,9-nonanediamine and 1,2-propanediamine, and (ii) about 0 to 55 equivalent percent of one or more polyamines selected from the group consisting of acyclic polyamines other than those amines of (b)(i), based on total equivalents of the amine component (b); and
(2) an epoxy resin, said epoxy resin having at least two epoxy groups per molecule of epoxy resin;
wherein the initial ratio of free amine and acid groups of the polyamide resin to epoxy groups of the epoxy resin is between about 1:1 and 1:10; and
wherein the cured composition possesses a tensile modulus of less than about 20,000 psi, using ASTM standard test method D 1708-84 and the secant modulus measurement technique defined in ASTM standard method D 638-89.

* * * * *

UNITED STATES PATENT AND TRADEMARK OFFICE
CERTIFICATE OF CORRECTION

PATENT NO. : 5,296,557
DATED : March 22, 1994
INVENTOR(S) : Charles R. Frihart

It is certified that error appears in the above-identified patent and that said Letters Patent is hereby corrected as shown below:

Column 12, line 41, change "form" to --from--

Column 12, line 57, change "maine" to --amine--

Column 14, line 10, change "Composition" to --composition--

Signed and Sealed this

Sixteenth Day of August, 1994

Attest:

BRUCE LEHMAN

Attesting Officer  Commissioner of Patents and Trademarks